Oct. 27, 1959 G. H. FATHAUER 2,910,531

TELEVISION CIRCUIT FOR OBTAINING STABLE SET-UP LEVEL

Filed Nov. 30, 1954

CAPACITOR 57 BALANCES OUT INTERELECTRODE CAPACITY OF DIODE 52

Inventor
GEORGE H. FATHAUER

By Hill, Sherman, Meroni, Gross & Simpson
Attys 2,910,531

TELEVISION CIRCUIT FOR OBTAINING STABLE SET-UP LEVEL

George H. Fathauer, Decatur, Ill., assignor to Thompson Ramo Wooldridge, Inc., a corporation of Ohio Application November 30, 1954, Serial No. 472,015

8 Claims. (Cl. 178—7.1)

Figure 1:
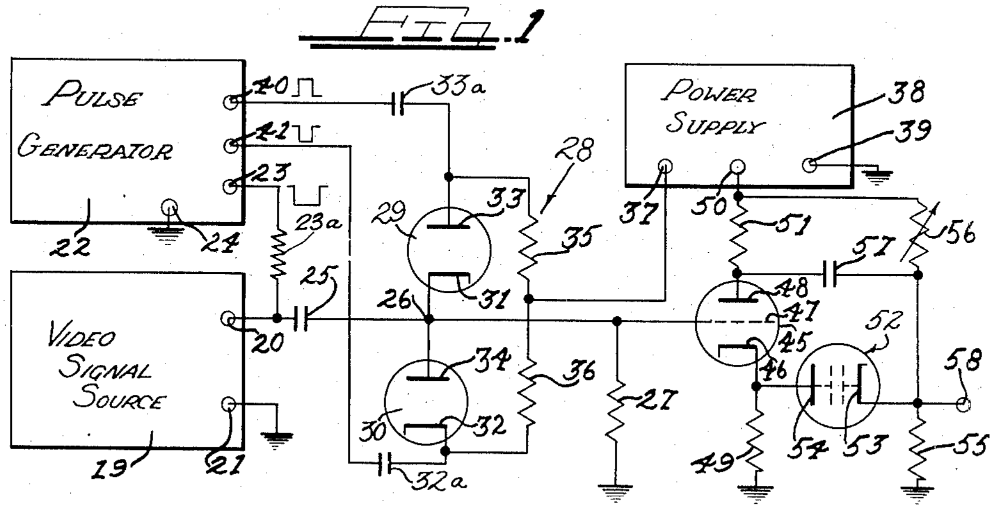

In television systems, a composite signal is transmitted which includes a video signal, controlling the intensity of the light at the receiver, horizontal and vertical synchronizing pulses for causing retrace of the horizontal and vertical sweep circuits at the receiver, and blanking pulses which serve important functions at the receiver. The blanking pulses are synchronized with the synchronizing pulses but are of greater duration than the synchronizing pulses and the start of the blanking pulses is slightly ahead of the start of the synchronizing pulses, the blanking pulses serving to black-out or blank the receiver picture tube during retrace. The blanking pulses also serve as a reference level for the synchronizing pulses, the synchronizing pulses being superimposed on the blanking pulses with the blanking pulses serving as a "pedestal" for the synchronizing pulses. The blanking pulses further serve a very important function in that they are employed as a reference level for use in determining picture blank.

In particular, the blanking pulses should, of course, have a direction or polarity such as to cause the picture to be black, and the video signal will contain peaks of like direction or polarity which should also cause the related element of the picture to be black. With the level of the blanking pulses properly related to such peaks of the video signal at the transmitter, the level of the blanking pulses at the receiver may be effectively used as a reference to determine picture black. Because of the occurrence of overshoots or transients in the black content of the picture, the level of the blanking pulses is not ordinarily used to directly indicate black, but it is usual operating practice to establish a difference in level between picture black and blanking level. In other words, the blanking level may be considered as blacker than black. The level difference between picture black and blanking level is termed the set-up level. Various standards are prescribed for this set-up level, and under one such standard, the set-up level should be 7%, plus or minus 2%, of the peak white level.

To establish this set-up level, a blanking signal of constant amplitude is combined with a video signal from the camera, the video signal having an amplitude much less than that of the blanking signal. The combined blanking and video signal is fed to a circuit operative to fix the level of such combined signal during the blanking pulses with respect to a reference point, such as ground. The output of this circuit is fed to a circuit designed to clip off a certain part of the blanking pulses of the composite signal, and the output of such clipping circuit should then contain blanking pulses at a fixed level slightly greater than the level of the video peaks.

The clipping circuits heretofore used have employed a diode coupling the plate of an amplifier tube, usually a pentode, to a succeeding stage, the diode being connected through a resistor to a point at a high positive potential, less than the potential of the point to which the plate is coupled. To operate satisfactorily, each of such potentials must be maintained constant to within a fraction of a volt and the permissible percentage variation is extremely small. In practice, it has been found impossible to maintain the voltages constant to the required degree, even with elaborate voltage regulator systems, and it has been necessary for an operator to constantly monitor and adjust the voltages to obtain the proper set-up level.

The circuits heretofore employed have suffered from a further draw back in that the resistance in the plate circuit of the pentode is much greater than the resistance that the diode operates into, and because of the fact that the gain of a pentode is dependent upon the load impedance, the gain during the blanking pulse is much greater than the gain during transmission of the video signal. Any stray or random signals which may exist during the blanking period are accordingly greatly amplified. To remedy this defect, an additional diode has been employed connected between the plate and another point at a high positive potential. However, this arrangement introduces another potential source which must be closely regulated.

According to this invention, a clipping circuit is provided which is very simple in design and operation and yet is extremely stable. In particular, the circuit of this invention comprises a cathode follower stage having an input responsive to a combined blanking and video signal such as described above and an output connected through a unidirectional conducting device to the succeeding stage. The cathode follower stage may preferably comprise a discharge device having a cathode, a grid and a plate or anode, with the cathode connected through an impedance to a point of fixed potential, such as ground, with the plate connected to a circuit point at a positive potential relative to ground, and with the input signal applied between the grid and ground. The unidirectional conduction device, which may be a diode, for example, may be connected between the cathode and the succeeding stage. Such device may also be connected through an impedance to a circuit point at a fixed potential relative to ground, preferably at a relatively low potential, and most preferably, such impedance may be directly connected to ground.

With this circuit, the set-up level is determined by the level of the combined signal at the input to the cathode follower, the potential of the point to which the plate is connected, and the potential on the output side of the unidirectional conductive device. The potential of the point to which the plate is connected is not directly effective in controlling the set-up level, but is effective only in that it effects the bias level of the discharge device. The potential at the output side of the unidirectional conduction device is equal to, or relatively close to, ground potential. As a consequence, while the permissible voltage variations at the input and output sides of the conduction device are still in the order of a fraction of a volt, the permissible percentage variation of the potentials of the circuit points is relatively great. This makes it possible to obtain very stable operation with practical power supplies and thus eliminate the necessity for continuous monitoring of the set-up level by an operator.

A specific feature of the invention is in a circuit arrangement for adjusting the step-up level. According to this feature, the output side of the unidirectional conductive device is connected through a suitable impedance to a point at a fixed potential relative to ground, preferably to the same point to which the plate of the cathode follower tube is connected. The value of such impedance relative to the output impedance is adjustable to adjust the potential at the output side of the unidirectional conduction device. With this arrangement, variations in the power supply voltage have little effect on the set-up level since such variations effect both the gain of the cathode follower stage and the bias levels with variations in one compensating for variations in the other.

A further important feature of the invention is in the provision of means for preventing coupling through the unidirectional conduction device during the blanking pulses. It will be appreciated that any type of unidirectional conduction device that is employed will have a certain internal capacitance which may be effective to couple signals from the cathode follower stage to the output. According to this invention, means are provided for neutralizing the effect of such internal capacitance. In particular, the plate of the cathode follower tube is connected through an impedance to a source of positive potential relative to ground, such impedance having a value substantially equal to the impedance used to connect the cathode of the tube to ground. With this arrangement, a voltage will be developed at the plate which is 180° out-of-phase with the voltage at the cathode. The plate is connected through a capacitor to the output side of the unidirectional conduction device, such capacitor having a value substantially equal to the internal capacitance of the conduction device. It will be appreciated that with this arrangement, no signal will be coupled from the cathode follower stage to the output during the blanking pulses.

An object of this invention, accordingly, is to provide a television circuit for obtaining extremely stable set-up level.

Another object of this invention is to provide a television circuit for obtaining highly stable set-up level which is readily adjustable to fix such level.

A further object of this invention is to provide a television circuit for obtaining highly stable set-up level in which the transmission of extraneous signals during the blanking pulses is minimized.

Figure 2:
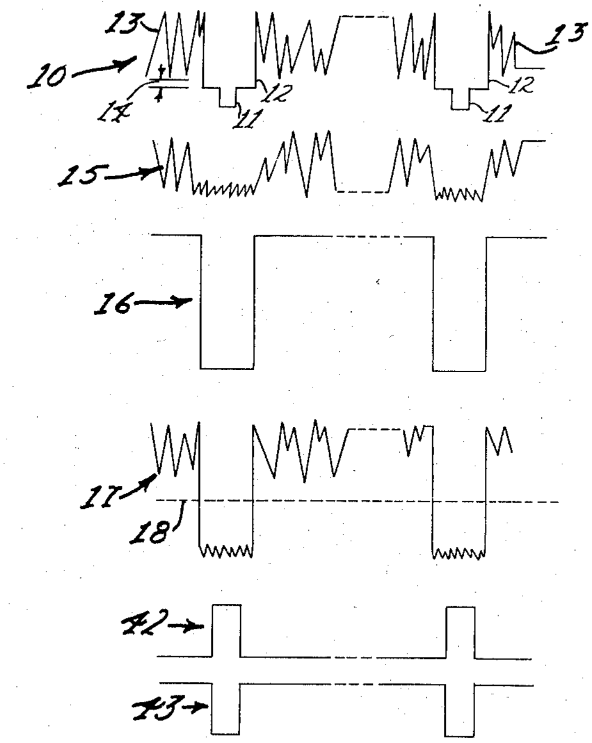

This invention contemplates other objects, features and advantages which will become more fully apparent from the following detailed description taken in conjunction with the accompanying drawing which illustrates a preferred embodiment and in which:

Figure 1 is a circuit diagram of a television circuit for obtaining highly stable set-up levels in accordance with the principles of this invention; and Figure 2 illustrates various wave forms usable in explaning the operation of the circuit of Figure 1.

Referring first to Figure 2, reference numeral 10 designates the wave form of a portion of a composite television signal which may be used to modulate a carrier to be transmitted to a receiver, then demodulated and utilized to control generation of a picture at the receiver. In the portion of such wave form illustrated are a pair of horizontal synchronizing pulses 11 which are superimposed on blanking pulses 12 serving as a "pedestal" for the synchronizing pulses 11. Between the blanking and synchronizing pulses is a video signal 13 of varying amplitude corresponding to the picture transmitted. The amplitude of the blanking pulses 12 should be at least as great as the peaks of the video signal 13 and preferably somewhat larger, the difference between the levels being indicated by reference numeral 14 and being termed the set-up level. Under one standard of practice, the set-up level should be 7% plus or minus 2% of the amplitude of the peak white level.

This invention is concerned with a circuit for fixing the level of the blanking pulses relative to the peaks of the video signal, that is the set-up level. Briefly, a video signal such as designated by reference numeral 15 in Figure 2 is combined with a blanking signal such as designated by reference numeral 16 to obtain a combined signal as designated by reference numeral 17 and such combined signal 17 is clipped off at a level such as designated by dotted line 18.

Referring now to Figure 1, reference numeral 19 designates a camera or other video signal source which may generate a video signal such as indicated by reference numeral 15 across output terminals 20 and 21, the terminal 21 being connected to ground as illustrated. Reference numeral 22 designates a pulse generator which may, among other things, generate blanking pulses such as designated by reference numeral 16 across terminals 23 and 24, the terminal 24 being connected to ground. The terminal 23 is connected through an impedance **23*a* to the terminal 20 which is connected through a capacitor 25 to a circuit point 26, for obtaining a combined wave form such as designated by reference numeral 17 in Figure 2. It is assumed that the source 19 has a certain internal impedance to permit this adding process to take place. The circuit point 26 is connected through a resistor 27 to ground which should have a high value so that the circuit has a long charge time. In fact, this resistor 27** may be eliminated entirely in practice.

With the circuit as thus far described, the relative levels of the blanking pulses of the combined signals might vary with variation in the energy content of the video signal therebetween or with "hum" signals, etc. To prevent such a variation, a clamping circuit generally designated by reference numeral 28 is provided. This circuit may in the form of a single diode restorer but preferably comprises a pair of diodes 29 and 30 having cathodes 31 and 32 and plates 33 and 34. The cathode 31 and the plate 34 are connected to the circuit point 26 and the plate 33 and cathode 32 are respectively connected through resistors 35 and 36, preferably of equal value, to a terminal 37 of a power supply 38, the potential of the terminal 37 being at a fixed potential, preferably adjustable, relative to a terminal 39 connected to ground. Means are provided for rendering both of the diodes 29 and 30 conductive during the blanking pulses so as to fix the potential of the circuit point 26 at the potential of the terminal 37 of the power supply 38. For this purpose, the plate 33 and the cathode 32 are respectively connected through capacitors **33*a* and 32*a* to terminals 40 and 41 of the pulse generator, which applies positive pulses at the terminal 40 and negative pulses at the terminal 41, such pulses being generated in synchronism with the blanking pulses, but being preferably of less duration. The wave forms at the terminals 40 and 41 may, for example, be as designated by reference numerals 42 and 43, respectively, in Figure 2. This driven clamp circuit 28** has a short charge time and a long discharge time and serves to correct poor low frequency response and to remove "hum" components, etc.

According to this invention, the combined wave form at the circuit point 26 is applied to a cathode follower circuit which may comprise a discharge device 45 which may be in the form of a triode having a cathode 46, a control grid 47 and a plate 48, although the device 45 may be a multi-grid tube if desired. The grid 47 is connected directly to the circuit point 26 so that its bias is fixed by the action of the circuit at the potential of the terminal 37, and the cathode is connected through an impedance 49, preferably in the form of a resistor, to ground. The plate 48 is coupled to a terminal 50 of the power supply 38 through an impedance 51, preferably a resistor, the terminal 50 being at a relatively high positive potential relative to the terminal 39 connected to ground.

It will be appreciated that with this cathode follower circuit as thus far described, a signal will be developed at the cathode 46 of a form closely approximating the input signal at the grid 47 but of slightly reduced amplitude. This signal at the cathode 46 is coupled through a unidirectional conduction device 52, preferably a diode having a cathode 53 and a plate 54. The plate 54 is connected directly to the cathode 46 and the cathode 53 is coupled through an impedance 55 to a point at a fixed potential relative to ground. Means are provided for establishing a D.-C. potential at the cathode 53 relative to ground so that during the blanking pulses, the plate 54 will be negative relative to the cathode 53 thus preventing the cathode 53 from going negative to the extent of the blanking pulse and thus effectively clipping off the blanking pulse. For this purpose, the impedance 55 may be connected to a point at a positive potential relative to ground, but preferably it is connected directly to ground and the cathode 53 is connected through an impedance 56 to a point at a positive potential relative to ground, preferably to the terminal 50 of the power supply 38. With this circuit, variations in the potential of the terminal 50 relative to ground will result in a change in the amplitude of the output of the cathode follower across the impedance 49 and will also result in a change in the biasing potential obtained across the impedance 55 with such changes being in a compensating relation, so that the effect on the set-up level from variations in the potential of the terminal 50 will be minimized. Further, the set-up level can be readily adjusted by adjusting the impedances 55 and 56 relative to each other, preferably by adjusting the impedance 56.

To neutralize the effect of internal capacitance of the device 52 and prevent transmission of stray or extraneous signals during the blanking pulses, the impedance 51 may have a value substantially the same as the impedance 49 and the plate 48 may be coupled to a capacitor 57 to the cathode 53 of the device 52, the capacitor 57 having a capacitance substantially equal to the internal capacitance of the device 52. With this circuit, the signal transmitted through the capacitor 57 will neutralize the signal transmitted through the device 52 during the blanking pulses and thus prevent any output at the cathode 53 during the blanking pulses.

It will be appreciated that the impedances 49 and 51 need not be of equal value and the capacitance of the capacitor 57 need not exactly equal the internal capacitance of the device 52, but by adjusting these values, the desired neutralizing effects may be obtained. From a design standpoint, it is of course easiest to make the impedances and capacitances equal.

It will, accordingly, be appreciated that with the circuit of this invention, an output signal is obtained across the impedance 55 in which the level of the blanking pulses and the level of the peaks of the video signal are fixed relative to each other, and will stay substantially fixed despite variations in operating conditions. This signal developed across the impedance 55 is, of course, coupled to further stages which may be coupled to a terminal 58 connected to the cathode 53.

It should be noted that while the invention has been discussed with reference to negative polarity video, it will also work with positive polarity video by reversing the conduction of the diode 52.

As illustrated, the device 45 is in the form of a triode and the device 52 is in the form of a diode, but other types of discharge devices may be used and the term "discharge device" and the term "unidirectional conduction device" are intended to include gaseous as well as vacuum devices, transistors and equivalents, and the terms "cathode," "grid" and "anode" or "plate" are likewise used in a sense to include equivalent elements.

It will, of course, be understood that modifications and variations may be effected without departing from the spirit and scope of the novel concepts of the present invention.

I claim as my invention:

1. In a television system in which a blanking signal including periodic pulses is combined with a video signal, a circuit for fixing the level of the blanking pulses relative to the peaks of the video signal, comprising: a discharge device having a cathode, a plate and a control grid, first impedance means for connecting said cathode to a first circuit point, means for applying a combined blanking signal and video signal between said grid and said first circuit point, means for connecting said plate to a second circuit point at a positive potential relative to said first circuit point, a unidirectional conduction device having one terminal coupled to said cathode, and second impedance means having a high impedance to video signals for connecting the other terminal of said conduction device to a third circuit point at a potential fixed with respect to the potential of said first circuit point.

2. In a television system in which a blanking signal including periodic pulses is combined with a video signal, a circuit for fixing the level of the blanking pulses relative to the peaks of the video signal, comprising: a discharge device having a cathode, a plate and a control grid, first impedance means for connecting said cathode to a first circuit point, means for applying a combined blanking signal and video signal between said grid and said first circuit point with the polarity of said combined signal being such that the blanking pulses swing the potential of said grid in a negative direction, means for connecting said plate to a second circuit point at a positive potential relative to said first circuit point, a unidirectional conduction device having first and second terminals and arranged to conduct current only from said first terminal to said second terminal, means coupling said first terminal to said cathode, and impedance means connected between said second terminal and a third circuit point at a potential fixed with respect to the potential of said first circuit point and substantially greater than the potential of said cathode during the application of the blanking pulses.

3. In a television system in which a blanking signal including periodic pulses is combined with a video signal, a circuit for fixing the level of the blanking pulses relative to the peaks of the video signal, comprising: a discharge device having a cathode, a plate and a control grid, first impedance means for connecting said cathode to a first circuit point, means for applying a combined blanking signal and video signal between said grid and said first circuit point, means for connecting said plate to a second circuit point at a positive potential relative to said first circuit point, a unidirectional conduction device having one terminal coupled to said cathode, second impedance means for connecting the other terminal of said conduction device to a third circuit point at a potential fixed with respect to the potential of said first circuit point, and third impedance means connecting the junction between said conduction device and said second impedance to a fourth circuit point at a fixed potential relative to said first circuit point.

4. In a television system in which a blanking signal including periodic pulses is combined with a video signal, a circuit for fixing the level of the blanking pulses relative to the peaks of the video signal, comprising; a discharge device having a cathode, a plate and a control grid, first impedance means for connecting said cathode to a first circuit point, means for applying in a combined blanking signal and video signal between said grid and said first circuit point, second impedance means for connecting said plate to a second circuit point at a positive potential relative to said first circuit point, a unidirectional conduction device having one terminal coupled to said cathode, third impedance means for connecting the other terminal of said conduction device to a third circuit point at a potential fixed with respect to said first circuit point, and a capacitor coupled directly between said plate and the junction between said conduction device and said third impedance.

5. In a television system in which a blanking signal including periodic pulses is combined with a video signal, a circuit for fixing the level of the blanking pulses relative to the peaks of the video signal, comprising; a discharge device having a cathode, a plate and a control grid, first impedance means for connecting said cathode to a first circuit point, means for applying in a combined blanking signal and video signal between said grid and said first circuit point, second impedance means for connecting said plate to a second circuit point at a positive potential relative to said first circuit point, a unidirectional conduction device having one terminal coupled to said cathode, third impedance means for connecting the other terminal of said conduction device to a third circuit point at a potential fixed with respect to said first circuit point, and a capacitor coupled between said plate and the junction between said conduction device and said third impedance, said first and second impedances having substantially the same value with the capacitance of said capacitor being substantially the same as the internal capacitance of said conduction device.

6. In a television system in which a blanking signal including periodic pulses is combined with a video signal, a circuit for fixing the level of the blanking pulses relative to the peaks of the video signal, comprising: a discharge device having a cathode, a plate and a control grid, first impedance means for connecting said cathode to a first circuit point, means for applying a combined blanking signal and video signal between said grid and said first circuit point, means for connecting said plate to a second circuit point at a positive potential relative to said first circuit point, a unidirectional conduction device having one terminal coupled to said cathode, second impedance means for connecting the other terminal of said conduction device to a third circuit point at a potential fixed with respect to the potential of said first circuit point, and means for adjusting the level of the blanking pulses relative to the peaks of the video signal including third impedance means connecting the junction between said conduction device and said second impedance to said second circuit point.

7. In a television system in which a blanking signal including periodic pulses is combined with a video signal, a circuit for fixing the level of the blanking pulses relative to the peaks of the video signal, comprising: a discharge device having a cathode, a plate and a control grid, first impedance means for connecting said cathode to a first circuit point, means for applying a combined blanking signal and video signal between said grid and said first circuit point, means for connecting said plate to a second circuit point at a positive potential relative to said first circuit point, a unidirectional conduction device having one terminal coupled to said cathode, and second impedance means having a high impedance to video signals for connecting the other terminal of said conduction device to said first circuit point.

8. In a television system in which a blanking signal including periodic pulses is combined with a video signal, a circuit for fixing the level of the blanking pulses relative to the peaks of the video signal, comprising: a discharge device having a cathode, a plate and a control grid, first impedance means for connecting said cathode to a first circuit point, means for applying a combined blanking signal and video signal between said grid and said first circuit point, means for connecting said plate to a second circuit point at a positive potential relative to said first circuit point, a unidirectional conduction device having one terminal coupled to said cathode, second impedance means for connecting the other terminal of said conduction device to said first circuit point, and means for adjusting the level of the blanking pulses relative to the peaks of the video signal including third impedance means connecting the junction between said conduction device and said second impedance to said second circuit point.

References Cited in the file of this patent

UNITED STATES PATENTS

| | | |
|---|---|---|
| 2,363,813 | Somers | Nov. 28, 1944 |
| 2,683,806 | Moody | July 13, 1954 |

FOREIGN PATENTS

| | | |
|---|---|---|
| 661,807 | Great Britain | Nov. 28, 1951 |

OTHER REFERENCES

"Waveforms," a book published by McGraw-Hill in 1949 for the MIT Radiation Laboratory Series. Page 335 cited QC 601 C5.